(12) United States Patent
Chanal

(10) Patent No.: US 7,436,142 B2
(45) Date of Patent: Oct. 14, 2008

(54) METHOD FOR MAINTAINING A DIRECT VOLTAGE AT THE INPUT OF A DC/AC VOLTAGE CONVERTER, RECORDING MEDIUM FOR THIS METHOD, AND ELECTRIC VEHICLE

(75) Inventor: Pierre Chanal, Vielle Adour (FR)

(73) Assignee: Alstom Transport, SA, Levallois-Perret (FR)

( * ) Notice: Subject to any disclaimer, the term of this patent is extended or adjusted under 35 U.S.C. 154(b) by 140 days.

(21) Appl. No.: 11/602,798

(22) Filed: Nov. 21, 2006

(65) Prior Publication Data

US 2007/0138995 A1 Jun. 21, 2007

(30) Foreign Application Priority Data

Oct. 7, 2005 (FR) .................................. 05 10283

(51) Int. Cl.
*B60L 7/06* (2006.01)
*H02P 27/04* (2006.01)

(52) U.S. Cl. ..................... 318/479; 318/376; 318/812

(58) Field of Classification Search ................. 318/139, 318/375–381, 455, 459, 478, 479, 500, 504, 318/798–812
See application file for complete search history.

(56) References Cited

U.S. PATENT DOCUMENTS 4,087,734 A * 5/1978 Blutreich .................... 320/149
4,454,455 A * 6/1984 Matulevich ................... 318/71
5,614,796 A 3/1997 Minderlein et al. ......... 318/376
7,304,445 B2 * 12/2007 Donnelly ..................... 318/108
2004/0238243 A1 * 12/2004 King et al. .................. 180/65.2
2005/0225918 A1 * 10/2005 Fuchs ......................... 361/100

FOREIGN PATENT DOCUMENTS

JP 57009270 1/1982
JP 61098187 5/1986
JP 62071404 4/1987

* cited by examiner

*Primary Examiner*—Bentsu Ro
(74) *Attorney, Agent, or Firm*—Davidson, Davidson & Kappel, LLC

(57) ABSTRACT

This method maintains a direct voltage at the input of a DC/AC voltage converter in order to maintain an asynchronous motor in a magnetised state, the input of the converter being connected to a DC supply bus of an electric vehicle, and comprises, in a free wheel mode during which the vehicle coasts and the bus is disconnected from a catenary:

a) a step (76) for magnetising the motor, then
b) a step (78) for operating the motor as a generator of alternating voltage, then
c) a step (72) for stopping the converter when the direct voltage of the bus reaches an upper threshold, then
d) a step (74) for maintaining the converter in the idle state as long as the direct voltage of the bus remains higher than a minimum direct magnetisation voltage of the asynchronous motor.

8 Claims, 2 Drawing Sheets

METHOD FOR MAINTAINING A DIRECT VOLTAGE AT THE INPUT OF A DC/AC VOLTAGE CONVERTER, RECORDING MEDIUM FOR THIS METHOD, AND ELECTRIC VEHICLE

TECHNICAL FIELD

The invention relates to a method for maintaining a direct voltage at the input of a DC/AC voltage converter in order to maintain an asynchronous motor in a magnetised state, a recording medium for this method, and an electric vehicle.

In this description, the term "supply bus" is used to designate a DC supply bus of an electric vehicle which can, on the one hand, be connected to and disconnected from a catenary and, on the other hand, is connected to the asynchronous motor by means of a DC/AC converter in order to supply this motor with electrical power. This bus is equipped with units for temporarily maintaining a direct voltage on the bus even when it is no longer supplied by the catenary. Typically, these maintenance units are formed by capacitors and discharge resistors.

The DC supply bus is also referred to as a "DC bus".

Catenary is intended to refer not only to suspended supply cables along which a pantograph of the electric vehicle slides but also a supply rail which is placed on the ground and along which a runner of the electric vehicle slides. This supply rail is known as a "third rail" in the railway industry.

BACKGROUND TO THE INVENTION

It is known to brake vehicles by causing the asynchronous motor to function as a generator and by dissipating the electrical power generated in resistors or a rheostat. The majority of manufacturers prefer this type of electrical or rheostatic braking to mechanical braking since it allows the maintenance costs to be minimised for wearing parts on these vehicles.

During a rheostatic braking operation, if the DC bus is connected to the catenary, a return of energy towards the catenary is seen. An energy return of this type is not acceptable for some users.

On the other hand, if the DC bus is disconnected from the catenary, the direct voltage on this bus progressively decreases and becomes insufficient to magnetise the motor so that a rheostatic braking operation is no longer possible.

In order to overcome this problem in a free wheel mode, during which the vehicle coasts (free wheeling) and the DC bus is disconnected from the catenary, known methods maintain a direct magnetisation voltage on this DC bus by carrying out a pre-braking phase.

This pre-braking phase comprises:
a) a step for magnetising the motor from the direct voltage present on the bus, then
b) a step for operating the motor as a generator of alternating voltage and operating the converter as a rectifier for the alternating voltage in order to recharge the bus with direct voltage.

In known methods, step b) lasts for as long as the vehicle is coasting and the DC bus is disconnected from the catenary. The motor therefore functions constantly as a generator in order to maintain an adequate level of magnetisation voltage on the DC bus.

This has the consequence of permanently imposing a deceleration of the electric vehicle, even if it is coasting.

The object of the invention is to overcome this disadvantage by providing a method which is capable of minimising the deceleration imposed on the electric vehicle in order to maintain a magnetisation voltage on the DC bus.

SUMMARY OF THE INVENTION

The invention therefore relates to a method for maintaining a direct magnetisation voltage on the DC bus, also comprising:
c) a step for stopping the converter when the direct voltage of the bus reaches an upper threshold, then
d) a step for maintaining the converter in the idle state as long as the direct voltage of the bus remains higher than a minimum direct magnetisation voltage of the asynchronous motor before returning to step a).

When the motor functions as a generator, the converter provides direct voltage to the DC bus which is charged and the motor brakes the vehicle.

When the converter is stopped, the motor no longer functions as a generator and therefore no longer brakes the electric vehicle. As long as the converter is maintained in an idle state, the voltage on the DC bus progressively decreases which corresponds to the discharge, for example, of capacitors of the DC bus. Consequently, by alternating steps a), b) and c), d), it is possible to maintain a direct magnetisation voltage on this bus without causing the motor to function permanently as a generator. This minimises the deceleration imposed on the electric vehicle in free wheel mode.

Furthermore, in this method, only the control of the converter is modified in such a manner that it is not necessary to use additional equipment in order to charge the DC bus just before a rheostatic braking operation.

Finally, the stopping of the converter also allows the units for temporarily maintaining direct voltage on the bus to be discharged so that it is not necessary to use an auxiliary item of equipment or a rheostat for this purpose.

The embodiments of this method may comprise one or more of the following features:
the slip pulse of the motor during step b) is selected to be equal to $1/T_r$ where $T_r$ is the time constant of the motor;
the upper threshold is selected to be lower than a minimum supply voltage for the auxiliary items of equipment,
during step b), the converter is controlled so that the energy generated by the motor is greater than the minimum energy required to compensate for the losses caused by heating of the motor and less than 1.05 times this minimum energy;
steps a) to d) are repeated only for as long as the electric vehicle is coasting at a speed greater than a predetermined speed threshold which allows the bus to be recharged.

The embodiments of the method for maintaining a direct magnetisation voltage further have the following advantages:
imposing a slip pulse equal to $1/T_r$ where $T_r$ is the time constant of the motor, decreases the losses caused by heating of the motor and therefore minimises the deceleration of the vehicle;
the fact that the auxiliary items of equipment connected to the DC bus are not supplied with electrical power also minimises the deceleration of the vehicle when it is coasting;
only causing the motor to generate electrical energy which is at the most equal to 1.05 times the energy required to compensate for the losses caused by heating of the motor allows the braking action to be made negligible in relation to the inertia of the vehicle and thus prevents the driver or the passengers from sensing juddering actions when alternating between steps b) and d).

The invention also relates to a data recording medium which comprises instructions for carrying out a method for maintaining direct magnetisation voltage of an asynchronous motor on a DC bus when these instructions are carried out by an electronic processor.

The invention also relates to an electric vehicle which is suitable for implementing the maintenance method above, this electric vehicle being equipped:

with at least one asynchronous motor for rotatably driving driving wheels, a controllable DC/AC converter which is capable of functioning as a direct voltage inverter in order to supply the motor and, alternately, as a direct voltage rectifier, a DC supply bus which can be connected to and disconnected from a catenary and which is connected to the motor by means of the converter in order to supply the converter with direct voltage, this bus being equipped with a device for temporarily maintaining a direct voltage on the bus when the bus is disconnected from the catenary, and a processor which is capable of controlling:

a) a magnetisation of the motor, then b) the operation of the motor as a generator and the operation of the converter as a rectifier during a free wheel mode during which the bus is disconnected from the catenary and the electric vehicle is coasting; and in which the processor is capable, during free wheel mode:

c) of controlling the stopping of the converter when the direct voltage of the bus reaches an upper threshold, and d) maintaining the converter in an idle state as long as the direct voltage of the bus remains higher than a minimum direct magnetisation voltage of the asynchronous motor, before repeating the commands a) and b).

The embodiments of this electric vehicle may comprise the following feature:

the device for temporarily maintaining a direct voltage is formed by at least one capacitor which is capable of temporarily maintaining a direct voltage on the supply bus when this bus is disconnected from the catenary.

BRIEF DESCRIPTION OF THE DRAWINGS

The invention will be better understood from a reading of the following description, given purely by way of example and with reference to the drawings, in which.

DESCRIPTION OF PREFERRED EMBODIMENTS

Figure 1:
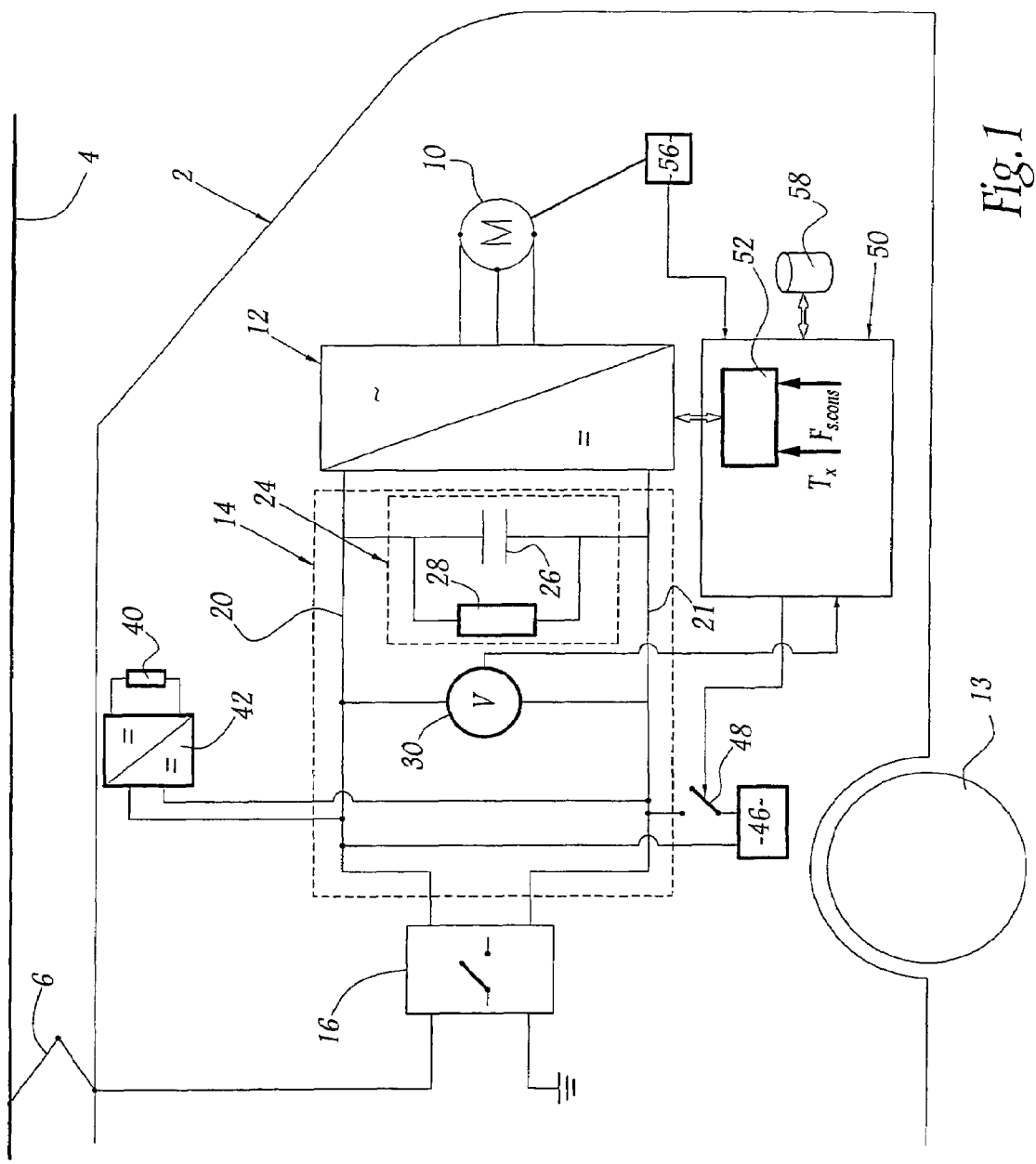
FIG. 1 is a schematic illustration of the architecture of an electric vehicle equipped with a DC bus.

FIG. 1 illustrates an electric vehicle 2 which is equipped with at least one asynchronous motor for rotatably driving driving wheels 13 of this vehicle. This vehicle is, for example, a locomotive which is connected to a catenary 4 by means of a pantograph 6.

In this instance, in order to simplify the illustration, only an electrical power supply system for an asynchronous motor 10 which is capable of rotatably driving the wheels 13 is illustrated.

The other electrical power supply systems for asynchronous motors of the vehicle 2 are, for example, identical to that described in this instance.

The electrical power supply system of the motor 10 comprises:

a controllable DC/AC converter 12 which is capable of supplying the windings on the stator of the motor 10, a DC bus 14 which is connected to the converter 12 in order to supply it with direct voltage, and a unit 16 for connecting the bus 14 to the catenary 4.

The converter 12 is capable of functioning as a direct voltage inverter in order to supply the motor 10 with three-phase voltage and, alternately, as a rectifier for alternating voltage in order to supply the bus 14 with rectified voltage produced from a three-phase voltage generated by the motor 10 when it functions as a generator.

The DC bus 14 is formed by two electrical conductors 20 and 21. Ends of the electrical conductors 20, 21 are connected to respective inputs of the converter 12. Opposite ends of the conductors 20 and 21 are connected to respective outputs of the connection unit 16.

The bus 14 also comprises at least one device for temporarily maintaining a direct voltage between the conductors 20 and 21. In this instance, in order to simplify the illustration, only a device 24 for temporarily maintaining a direct voltage is illustrated. The device 24 is, for example, formed by a capacitor 26 which is connected between the conductors 20 and 21 and a discharge resistor 28 of the capacitor which is connected in parallel with the terminals of the capacitor 26. The resistor 28 is selected, for example, to allow a reduction of 50 volts per second of the direct voltage present at the terminals of the capacitor 26.

The direct voltage $V_{bus}$ on the bus 14 is measured by a voltmeter 30. The voltage $V_{bus}$ is equal to $1800 V_{DC}$ when the bus 14 is connected to the catenary 4.

The connection unit 16 allows the bus 14 to be electrically connected to and disconnected from the catenary 4. To this end, an input of the unit 16 is connected to the catenary 4 by means of the pantograph 6. The unit 16 contains, for example, a circuit-breaker and, optionally, a voltage rectifier if the catenary 4 is supplied with an alternating voltage.

The bus 14 is also used to supply items of auxiliary equipment of the vehicle 2, such as, for example, a heating device, a ventilation device or water pumps. In order to simplify the illustration, only one item of auxiliary equipment 40 is illustrated. The item of equipment 40 is connected to the conductors 20 and 21 by means of a DC/DC converter 42. This converter 42 is able to automatically cut off the electrical power supply to the item of equipment 40 when the voltage $V_{bus}$ is lower than a predetermined threshold $S_h$. By way of example, for a bus 14 on which the direct voltage is normally $1800 V_{dc}$, The threshold $S_h$ is selected to be equal to $900 V_{dc}$, that is to say, half the normal direct voltage.

The bus 14 is also connected to a rheostat 46 by means of a controllable switch 48.

This rheostat is intended to dissipate the energy generated by the motor 10 during a rheostatic braking operation.

Figure 2:
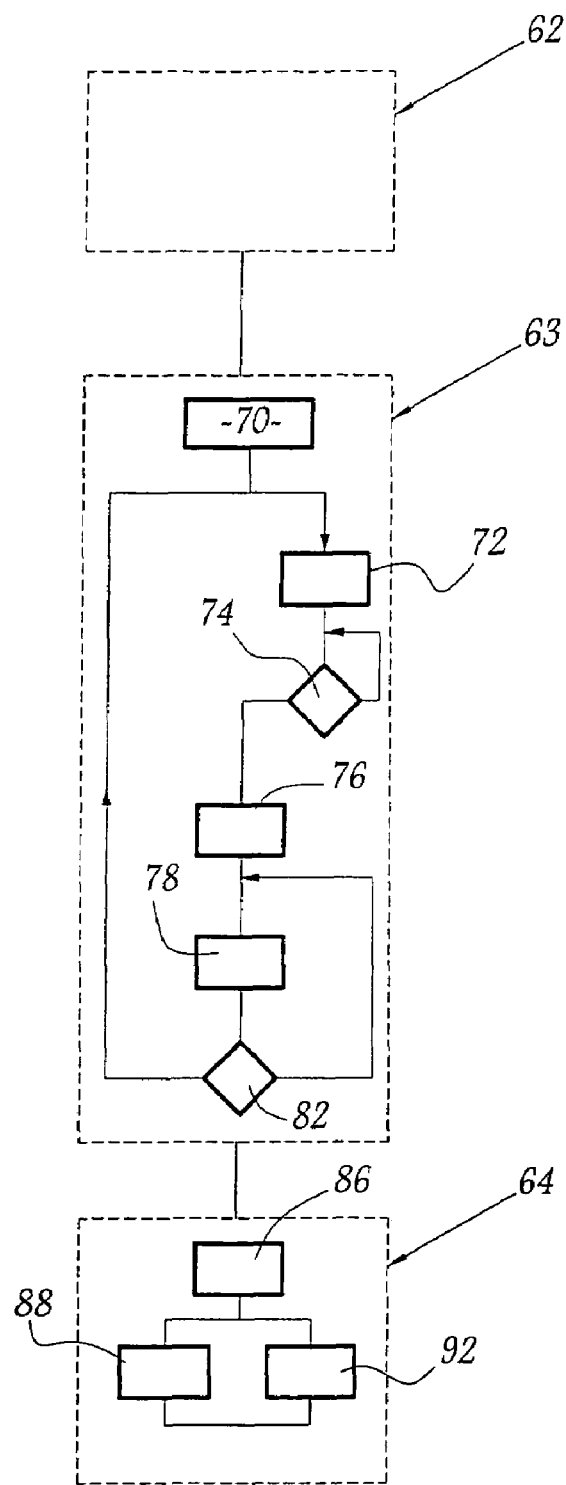
FIG. 2 is a flow chart of a method for maintaining a direct magnetisation voltage of an asynchronous motor on the DC bus of the vehicle of FIG. 1.

The vehicle 2 also comprises an electronic processor 50 which is capable of controlling the converter 12 in order to carry out the method of FIG. 2 for maintaining a magnetisation voltage. This processor is also capable of controlling the switch 48.

In order to control the converter 12, the processor comprises a conventional module 52 for controlling by means of pulse width modulation. This module 52 is equipped with two inputs, one for receiving a stator frequency variable $f_{s.cons}$ for the motor and the other for receiving a modulation ratio $T_x$.

The stator frequency is the frequency at which the magnetic field rotates inside the motor 10. This frequency corresponds to a synchronisation speed.

In order to carry out the method of FIG. 2, the processor 50 is connected to the voltmeter 30 and to a sensor 56 for detecting the mechanical frequency of the rotor. The a mechanical frequency corresponds to the rotation speed of the shaft of the motor 10.

The processor 50 is in this instance produced from a conventional programmable processor which is capable of carrying out instructions which are recorded on a data recording medium 58. To this end, the medium 58 comprises instructions for carrying out the method of FIG. 2 when these instructions are carried out by the processor 50.

The operation of the processor 50 and the electrical power supply system of the motor 10 will now be described with reference to the method of FIG. 2.

The vehicle 2 can switch between the three following operating modes:
- a traction mode 62 during which the motor 10 rotatably drives the driving wheels 13,
- a free wheel mode 63 during which the vehicle coasts and the bus 14 is disconnected from the catenary 4, and
- a rheostatic braking mode 64 during which the vehicle 2 is decelerated.

In traction mode, the bus 14 is connected to the catenary 4 by means of the unit 16. In this traction mode, the converter 12 functions as an inverter in order to supply the motor with electrical power using a three-phase voltage which is produced from the direct voltage present on the bus 14.

When the vehicle 2 travels on a slope where it is necessary to allow it to decelerate gently, it is then advantageous to switch into free wheel mode 63. In this free wheel mode, the unit 16 disconnects the bus 14 from the catenary 4 during a step 70. Then the processor 50 stops the converter 12 during a step 72. When the converter 12 is stopped, the motor 10 is no longer supplied with electrical power and becomes demagnetised. Then, the processor carries out a step 74 for maintaining the converter 12 in the idle state as long as the voltage $V_{bus}$ is greater than a minimum magnetisation voltage $V_{min}$ of the motor 10. During this step 74, the voltage $V_{bus}$ decreases progressively since the capacitor 26 is discharged by means of the resistor 28.

As soon as the voltage $V_{bus}$ measured by the voltmeter 30 becomes lower than the threshold $V_{min}$, the processor controls the converter 12 during a step 76 in order to magnetise the motor 10 from the voltage $V_{bus}$ which is still present on the bus 14. At this time, the voltage $V_{bus}$ is equal, for example, to the threshold $V_{min}$.

As soon as the magnetisation of the motor begins and without waiting for the motor to be completely magnetised, the processor 50 controls the converter so that it causes the motor 10 to function as a generator during a step 78. During the step 78, the processor 50 also controls the converter 12 so that it functions as a rectifier. During steps 76 and 78, the motor 10 generates an alternating three-phase voltage which is rectified by the converter 12 so that the DC bus 14 is supplied with direct voltage, which allows the device 24 to be recharged.

More precisely, during step 78, the frequency variable $F_{s,cons}$ is selected to be equal to the mechanical frequency measured by the sensor 56 less one slip pulse $F_g$. In this embodiment, the pulse $F_g$ is selected to be equal to $1/T_r$, where $T_r$ is the time constant of the motor. Owing to this selection of the slip pulse, the direct current $I_d$ and the quadrature current $I_q$ which are used to control the motor 10 are equal, which minimises the losses caused by heating. Losses caused by heating are intended in this instance to refer to losses owing to the Joule effect and losses caused by friction.

During step 78, the modulation ratio variable $T_x$ sent to the module 52 is determined in accordance with the following relationship:

$$T_x = [0.78 \cdot V_{bus}]/V_{ac} \qquad (I)$$

"·" is the multiplication symbol,
"/" is the "division" symbol,
$V_{bus}$ is the direct voltage on the bus 14,
$V_{AC}$ is the effective alternating voltage between phases generated by the motor 10.

During step 78, the processor controls the motor by means of the converter 12 so that this quantity of energy produced by the motor 10 is just higher than the minimum quantity of energy required to compensate for losses caused by heating of the motor 10 and at the most equal to 1.05 times this minimum energy. In this manner, the quantity of energy generated by the motor 10 is slightly surplus relative to the quantity of energy consumed by the motor 10 itself.

This surplus of energy therefore allows the capacitor 26 to be charged. Furthermore, as this surplus of energy is small, it corresponds to a minimal braking of the motor 10 so that the driver of the vehicle senses no juddering actions when the motor 10 begins to function as a generator.

During a step 82, the processor 50 verifies that the voltage $V_{bus}$ is lower than the threshold $S_h$. If this is the case, the operation of the motor as a generator and the operation of the converter 12 as a rectifier during step 78 are maintained.

Otherwise, the processor-returns to step 72.

In this manner, since the voltage on the bus 14 does not exceed the threshold $S_h$, items of auxiliary equipment, such as the item of equipment 40, are not supplied with electrical power which allows the quantity of energy taken from the motor operating as a generator to be limited and therefore allows the deceleration of the vehicle 2 to be limited.

Steps 72 to 82 are repeated as long as the vehicle is coasting at a sufficient speed to allow the motor 10 to recharge the capacitor 26 during step 78. For example, the speed of the vehicle 2 must be greater than a predetermined threshold of 10 km/h. When the speed of the vehicle 2 is no longer sufficient to recharge the capacitor 26, the vehicle switches into a conventional operating mode using, for example, a pre-braking phase.

At any time, during the free wheel mode, the driver of the vehicle 2 can move into rheostatic braking mode. To this end, for example, the driver moves a brake handle. In response to this movement, the processor 50 carries out a step 86 for magnetising the motor 10 from the voltage $V_{bus}$ present on the bus 14. This step 86 is, for example, identical to step 76. Then, as soon as the motor 10 begins to become magnetised, the processor 50 controls the converter 12 during a step 88 in order to cause the motor 10 to function as a generator and the converter 12 as a rectifier.

In parallel, during a step 92, the processor 50 controls the closure of the switch 48 in order to connect the rheostat 46 to the DC bus. In this operating state, the three-phase voltage generated by the motor 10 is converted by the converter 12 into direct voltage on the DC bus. This direct voltage is dissipated by the rheostat 46 in the form of heat which allows the vehicle 2 to be braked.

Steps 88 and 92 last for as long as the driver maintains his braking action.

A number of other embodiments of the vehicle 2 and the method of FIG. 2 are possible. In step 82, for example, the threshold from which the processor 50 stops recharging the bus 14 may be selected to be different from the threshold $S_h$.

The invention claimed is:

1. Method for maintaining a direct voltage at the input of a DC/AC voltage converter in order to maintain an asynchronous motor in a magnetised state, the input of the DC/AC converter being electrically connected to a DC supply bus of an electric vehicle, this supply bus being able to be connected to and disconnected from a catenary in order to supply the motor, this method comprising, in a free wheel mode during which the vehicle coasts and the bus is disconnected from the catenary:
   a) a step for magnetising the motor from the direct voltage present on the bus, then
   b) a step for operating the motor as a generator of alternating voltage and operating the converter as a rectifier for the alternating voltage in order to recharge the bus with direct voltage,
   wherein, in free wheel mode, the method also comprises:
   c) a step for stopping the converter when the direct voltage of the bus reaches an upper threshold, then
   d) a step for maintaining the converter in the idle state as long as the direct voltage of the bus remains higher than a minimum direct magnetisation voltage of the asynchronous motor before returning to step a).

2. Method according to claim 1, wherein the slip pulse of the motor during step b) is selected to be equal to $1/T_r$ where $T_r$ is the time constant of the motor.

3. Method according to claim 1, for an electric vehicle which is equipped with at least one item of auxiliary electrical equipment whose electrical power supply from the bus is automatically cut off when the direct voltage of the bus falls below a minimum supply voltage for the items of auxiliary equipment, wherein the upper threshold is selected to be lower than this minimum supply voltage for the items of auxiliary equipment.

4. Method according to claim 1, wherein, during step b), the converter is controlled so that the energy generated by the motor is greater than the minimum energy required to compensate for the losses caused by heating of the motor and less than 1.05 times this minimum energy.

5. Method according to claim 1, wherein steps a) to d) are repeated only for as long as the electric vehicle is coasting at a speed greater than a predetermined speed threshold which allows the bus to be recharged.

6. Data recording medium, wherein it comprises instructions for carrying out a method according to claim 1, when these instructions are carried out by an electronic processor.

7. Electric vehicle equipped:
   with at least one asynchronous motor for rotatably driving driving wheels,
   a controllable DC/AC converter which is capable of functioning as a direct voltage inverter in order to supply the motor and, alternately, as a direct voltage rectifier,
   a DC supply bus which can be connected to and disconnected from a catenary and which is connected to the motor by means of the converter in order to supply the converter with direct voltage, this bus being equipped with a device for temporarily maintaining a direct voltage on the bus when the bus is disconnected from the catenary, and
   a processor which is capable of controlling:
   a) a magnetisation of the motor, then
   b) the operation of the motor as a generator and the operation of the converter as a rectifier during a free wheel mode during which the bus is disconnected from the catenary and the electric vehicle is coasting;
   wherein the processor is also capable, during free wheel mode:
   c) of controlling the stopping of the converter when the direct voltage of the bus reaches an upper threshold, and
   d) maintaining the converter in an idle state as long as the direct voltage of the bus remains higher than a minimum direct magnetisation voltage of the asynchronous motor, before repeating the commands a) and b).

8. Electric vehicle according to claim 7, wherein the device for temporarily maintaining a direct voltage is formed by at least one capacitor which is capable of temporarily maintaining a direct voltage on the supply bus when this bus is disconnected from the catenary.

* * * * *